Nov. 22, 1927.
L. J. SMITH ET AL
1,650,099
TUBING SWAB
Filed July 20, 1926
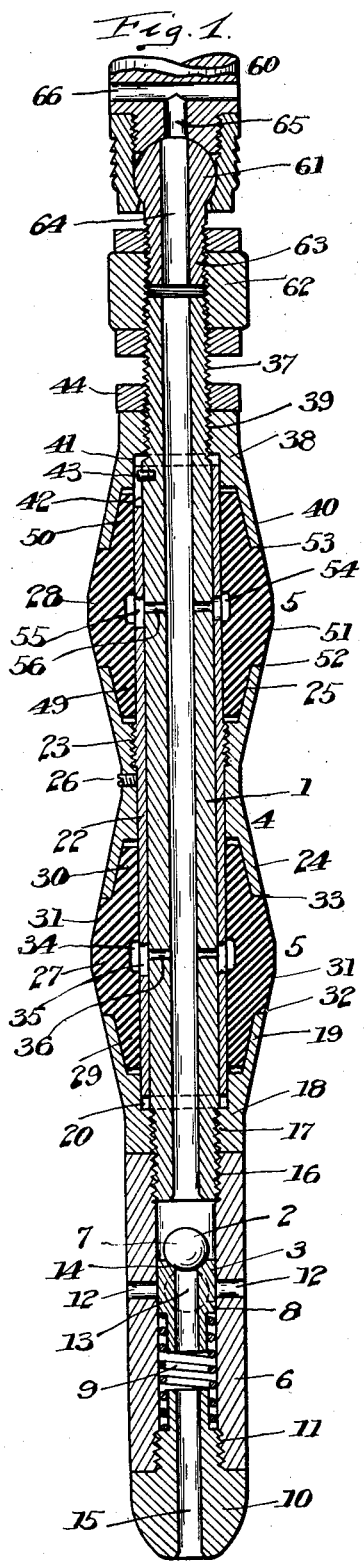
INVENTOR.
Louis J. Smith
and George B. M. Smith,
BY
Robt. D. Pearson
ATTORNEY.

Patented Nov. 22, 1927.

1,650,099

UNITED STATES PATENT OFFICE.

LOUIS J. SMITH AND GEORGE B. M. SMITH, OF TORRANCE, CALIFORNIA.

TUBING SWAB.

Application filed July 20, 1926. Serial No. 123,668.

Our invention relates to swabs and more particularly to a swab for oil well and water well casings.

An important object of the invention is to provide a swab of the character stated in which is included an improved detachable mounting for the swab elements, whereby said elements may be quickly removed from the swab proper and assembled thereon for repairs or other purposes.

Another object is to provide a swab with expansible swab elements including pressure relief means to relieve excessive fluid pressure from said elements so that they will not bind in well casings.

Other objects and advantages will appear hereinafter.

The invention is illustrated in the annexed drawing which forms a part of this specification and in which:

Fig. 1 is an enlarged vertical longitudinal section of the swab.

Fig. 2 is an enlarged elevation of the swab mounting.

Fig. 3 is an elevation of the swab shown in a well casing which is shown in section.

Corresponding reference characters designate the same parts in all the figures.

Our swab includes a hollow stem 1, a check valve 2 and a pressure relief valve 3 mounted on the lower end of said stem, a swab mounting 4 on said stem and a plurality of swab elements 5 mounted on said mounting.

The valves 2 and 3 include a cage 6, while the check valve 2 includes a ball 7 and the relief 3 includes a hollow slide 8 and a spring 9 bearing at its upper end against said slide and at its lower end against a base 10 screw-seated at 11 in the lower end of the cage 6, there being relief ports 12 in said cage which the slide 8 normally closes under the influence of the spring 9. The slide 8 has a port 13 extending axially therethrough and is formed with a seat 14 at its upper end for the check valve 2. The base 10 has a port 15 extending longitudinally therethrough in communication with the interior of the cage 6. The cage 6 is screw-seated at its upper end on the lower end of the stem 1 as at 16, and on said end of the stem above the cage is screw-seated at 17 a socket element 18, formed at its upper end with an upwardly diverging conical socket 19, and with a cylindrical bore 20 in the bottom of said socket.

The mounting 4 comprises a sleeve 21 and a double socket element 22 screw-seated at 23 on said sleeve midway of its ends, which socket element includes a lower downwardly diverging conical socket 24 and an upper upwardly diverging conical socket 25. The socket element 22 is locked against turning on the sleeve 1 by a set screw 26 seated in the element and engaging said sleeve.

The swab elements 5 comprise annular rubber swabs 27 and 28 which are fitted on the sleeve 21. The swab 27 is formed with lower and upper reduced conical ends 29 and 30 which fit in the sockets 19 and 24 respectively, and the periphery 31 of the swab between said reduced ends is double conical and flush with the exterior of the conical sockets 19 and 24, there being annular shoulders 32 and 33 on said swab between said reduced ends and said periphery which shoulders are engaged by the ends of the sockets 19 and 24 respectively. The swab 27 is formed with an internal annular groove 34 which registers with a longitudinal slot 35 in the sleeve 21, which slot in turn registers with a port 36 in the stem 1 leading from the bore of the stem through the periphery thereof. The lower end of the sleeve 21 fits in the cylindrical bore 20 of the socket element 18.

The upper end of the stem 1 is provided with a thread 37. A socket element 38 is bored and provided with an internal thread 39 which engages the thread 37 on the stem 1 to hold the element on the stem. Said element is formed with a downwardly diverging conical socket 40 and with a cylindrical bore 41 in the upper wall of said socket, in which bore fits the upper end of the sleeve 21. The upper end of said sleeve is provided with a slot 42 into which projects a pin 43 secured in the stem 1. A lock nut 44 fits on the thread 37 and engages the upper end of the socket element 38 to lock said element against turning on its thread.

The swab 28 is similar in construction to the swab 27 and is formed with lower and upper reduced conical ends 49 and 50 which fit in the sockets 25 and 40 respectively and the periphery 51 of the swab between said reduced ends is double conical and flush with the exterior of the conical sockets 25 and 40, there being annular shoulders 52 and 53 on said swab between said reduced ends and said periphery, which shoulders are engaged by the edges of the sockets 25 and 40 respectively. The swab 28 is formed with an internal annular groove 54 which registers with a longitudinal slot 55 in the sleeve 21, which slot in turn registers with a port 56 extending from the interior of the stem 1 through the periphery thereof.

The upper end of the stem 1 is swivelly connected to a head 60 by a ball and socket joint 61 and a screw coupling 62 which screws on the upper threaded end of the stem 1 and the threaded shank 63 of the ball member of said joint. Said ball member is provided with an axial bore 64 which communicates at its lower end with the bore of the stem 1 and at its upper end with an axial bore 65 in the head 60, which axial bore connects with a bore 66 extending diametrically through the head.

The head is formed with an upper threaded extension 67 which is screw connected to the lower end of a suspension rod 68.

The swab 27 may be compressed and expanded between the sockets 19 and 24 by turning the socket element 18 upwardly on the screw 17, during which operation the reduced conical ends 29 and 30 are compressed tightly against the sleeve 24 while the periphery 31 of the swab is expanded against the inner surface of the well casing 70 so as to effectively swab the same when the swab is raised or lowered in the casing. The swab 28 may be compressed and expanded between the sockets 25 and 40 in the same manner as the swab 27, by turning the socket element 38 downwardly on its screw seat 39.

On the downward movement of the swab in the well casing the valve 2 rises off its seat 14 and fluid passes upwardly through the cage 6 and stem 1 and escapes back into the casing through bores 65 and 66 in the head 60, allowing the swab to pass downwardly freely in the casing.

When the swab is pulled upwardly the valve 2 closes and prevents escape of fluid through the lower end of the swab while the fluid under the great pressure of its weight in the well passes through the ports 36 and 56, slots 35 and 55, into the annular swab grooves 34 and 54 and expands the swabs 27 and 28 into tight frictional contact with the interior of the casing 70, so that the casing will be effectively swabbed and cleaned by the swab on its upward movement.

Should the swabs be expanded too tightly against the casing or the load of fluid above said swabs in the casing become too great, due to too great a column of said fluid, the relief valve 3 will descend under said load against the tension of the spring 9, until it uncovers the ports 12 through which the fluid may escape from the swab and relieve such excessive load-pressure.

We claim:

1. A swab comprising a hollow stem, an adjustable socket mounted on the lower end of said stem, a sleeve detachably mounted on said stem, a pair of sockets secured on said sleeve between the ends thereof, an elastic swab member on said sleeve held between said first socket and one of said pair of sockets, a second socket adjustably mounted on said stem, an elastic swab member on said sleeve held between the other of said pair of sockets and said second socket, said swab members being provided with internal annular grooves and said stem and sleeve being provided with communicating means between the interior of said stem and said annular grooves.

2. A swab comprising a hollow stem, a socket adjustably mounted on the lower end of said stem, a sleeve detachably mounted on said stem, a pair of sockets secured on said sleeve between the ends thereof, an elastic swab member on said sleeve held between said first socket and one of said pair of sockets, a second socket adjustably mounted on said stem, an elastic swab member on said sleeve held between the other of said pair of sockets and said second socket, the swab members having conical ends; said sockets being conical to receive said conical ends, said swab members being provided with internal annular grooves, and said stem and sleeve being provided with communicating means between the interior of said stem and said annular grooves.

3. A swab comprising a hollow stem; a sleeve mounted on said stem said stem and sleeve being provided with a port connecting between the bore of said stem and the periphery of said sleeve; a socket member mounted on said sleeve; a second socket member adjustably mounted on said hollow stem and an elastic swab member interposed between said socket members and engaging in the sockets thereof said elastic swab being provided with annular shoulders adapted to engage respectively with the edges of said socket members.

In testimony whereof we affix our signatures.

LOUIS J. SMITH.
GEORGE B. M. SMITH.